(12) United States Patent
Azens et al.

(10) Patent No.: US 7,099,062 B2
(45) Date of Patent: Aug. 29, 2006

(54) ELECTROCHROMIC FILM AND DEVICE COMPRISING THE SAME

(75) Inventors: Andris Azens, Uppsala (SE); Claes-Göran Granqvist, Uppsala (SE); Richard Karmhag, Uppsala (SE); Jan Isidorsson, Trollhattan (SE); Esteban Damian Avendano Soto, Uppsala (SE)

(73) Assignee: Forskarpatent I Uppsala AB, Uppsala (SE)

( * ) Notice: Subject to any disclaimer, the term of this patent is extended or adjusted under 35 U.S.C. 154(b) by 0 days.

(21) Appl. No.: 10/490,944

(22) PCT Filed: Sep. 26, 2002

(86) PCT No.: PCT/SE02/01762

§ 371 (c)(1),
(2), (4) Date: Jul. 13, 2004

(87) PCT Pub. No.: WO03/027762

PCT Pub. Date: Apr. 3, 2003

(65) Prior Publication Data

US 2004/0234822 A1     Nov. 25, 2004

(30) Foreign Application Priority Data

Sep. 26, 2001   (SE) .................................... 0103198

(51) Int. Cl.
*G02F 1/15* (2006.01)
(52) U.S. Cl. ...................... 359/265; 252/586
(58) Field of Classification Search ................. 359/265
See application file for complete search history.

(56) References Cited

U.S. PATENT DOCUMENTS 6,266,177 B1 * 7/2001 Allemand et al. .......... 359/265

FOREIGN PATENT DOCUMENTS

| JP | 59-180526 | 10/1984 |
| WO | WO 00/71777 | 11/2000 |

OTHER PUBLICATIONS

Azens et al., "Electrochromism in Ir-Mg oxide films", Applied Physics Letters, Jul. 29, 2002, vol. 81, No. 5, pp. 928-929.
Rougier et al., "Electrochromic W-M-O (M=V, Nb) sol-gel thin films: a way to neutral colour", Solar Energy Materials & Solar Cells, Feb. 2002, vol. 71, No. 3, pp. 343-357.

(Continued)

*Primary Examiner*—Scott J. Sugarman
*Assistant Examiner*—Richard Hanig
(74) *Attorney, Agent, or Firm*—Young & Thompson

(57) ABSTRACT

Electrochromic film with the general formula: $A_pB_qO_xX_y$ wherein: —A is one or more of the elements from the group consisting of Ni, Ir, Cr, V, Mn, Fe, W, Mo, Ti, Co, Ce, Pr and Hf; —B is one or more of the elements from the group consisting of Mg, Ca, Sr, Ba, Nb, Al, Zr, Ta and Si; —O is oxygen; —X is an element from the group consisting of: H, F and N; and the ratio q/p is greater than 0.2 and less than 3.5, x is greater than 0.5 (p+q) and less than 5 (p+q), and y is equal to or greater than 0 and less than 2x. The film may further comprise an amount of Li, Na or K. The invention further relates to an electrochromic device comprising at least one layer of said electrochromic film.

24 Claims, 5 Drawing Sheets

OTHER PUBLICATIONS

Rodewald et al., "The Effect of the Oxygen Exchange at Electrodes on the High-Voltage Electrocoloration of Fe-Doped $SrTiO_3$, Single Crystals: A combined SIMS and Microelectrode Impedance Study", Journal of Electroceramics, Nov. 2001, vol. 7, No. 2, pp. 95-105.

Da Costa et al., Alternative $Nb_2O_5$-$TiO_2$ thin films for electrochromic devices, Journal of Material Science, Mar. 2001, vol. 36, No. 6, pp. 1407-1410.

Zheng-Wen Fu et al., "Lithiation and Electrochromic Characteristics of Composite $Ta_2O_5$-$TiO_2$ Films Fabricated by Ultraviolet Reactive Laser Ablation", Journal of the Electrochemical Society, Jun. 2000, vol. 147, No. 6, pp. 2371-2374.

Avellaneda et al., "Electrochemical and optical properties of $WO_3$:X Sol-Gel coatings, (X=Li, Ti, Nb, Ta)", Proceedings of SPIE—The International Society for Optical Engineering, 2000, vol. 4104, pp. 57-63.

Avellaneda et al., "Preparation and characterization of lithium doped and undoped $CeO_2$-$TiO_2$-$ZrO_2$ films", Proceedings of SPIE—The International Society for Optical Engineering, 2000, vol. 3943, pp. 306-312.

Schmitt et al., "Electrochromic properties of $Nb_2O_5$ :X sol-gel coatings (X=Sn, Zr, Li, Ti, Mo)", Proceedings of the SPIE—The International Society for Optical Engineering, 1999, vol. 3788, pp. 93-102.

Schmitt et al., "Properties of electrochromic devices made with $Nb_2O_5$ and $Nb_2O_5$:X sol-gel coatings (X=Li, Ti or Mo) as coloring electrode", Proceedings of the SPIE—The International Society for Optical Engineering, 1999, vol. 3788, pp. 75-83.

Orel et al., "Amorphous Nb/Fe-Oxide Ion-Storage Films for Counter Electrode Applications in Electrochromic Devices", Journal of the Electrochemical Society, May 1998, vol. 145, No. 5, pp. 1607-1614.

Guan et al., "The Electrical Degradation and Coloration In Iron Doped $KTa_{1-x}Nb_xO_3$ Single Crystals", Chrystal Research and Technology, 1997, vol. 32, No. 6, pp. 831-835.

Klingler et al., "Three-layer electrochromic system", Solar Energy Materials and Solar Cells, Dec. 1995, vol. 39, Nos. 2-4, pp. 247-255.

Maestro et al., "Industrial applications of rare earths: which way for the end of the century?", Journal of Alloys and Compounds, 1995, vol. 225, pp. 520-528.

Cogan et al., "Electrochromism in Nb-V and Cr-V Mixed-Oxides", Journal of the Electrochemical Society, Jan. 1993, vol. 140, No. 1, pp. 112-115.

Gillet et al, "Niobium Tungsten Titanium Oxides: From "Soft Chemistry " Precursors to Electrochromic Thin Layer Materials", Materials Research Bulletin, Oct. 1992, vol. 27, No. 10, pp. 1145-1152.

Bendert et al., "Effect of Coprecipitated Metal Ions on the Electrochromic Properties of Nickel Hydroxide", Journal of the Electrochemical Society, May 1989, vol. 136, No. 5, pp. 1369-1374.

Ziegler et al., "Polycrystalline n-$SrTiO_3$ as an electrode for the photoelectrochromic switching of Prussian blue films", Journal of Applied Physics, Apr. 15, 1987, vol. 61, No. 8, pp. 3099-3104.

Machida et al., "Electrochromic Properties of Sputtered Amorphous Films in the Systems $WO_3$-$Nb_2O_5$ and $Li_2O$-$WO_3$-$Nb_2O_5$ ", Journal of the Electrochemical Society, Sep. 1986, vol. 133, No. 9, pp. 1963-1966.

Fiebig et al., "Reflection spectroscopy on the photoinduced local metallic phase of $Pr_{0.7}Ca_{0.3}MnO_3$ ", Applied Physics Letters, Apr. 19, 1999, vol. 74, No. 16, pp. 2310-2312.

* cited by examiner

US 7,099,062 B2

ELECTROCHROMIC FILM AND DEVICE COMPRISING THE SAME

FIELD OF THE INVENTION

The present invention relates to a novel electrochromic film and an electrochromic device comprising at least one layer of such an electrochromic film.

BACKGROUND OF THE INVENTION

Today, electrochromic devices are mainly commercially available as dimable mirrors in cars. However, in a near future electrochromic devices are expected to be widely used in a large variety of applications such as displays for computers and mobile phones, switchable windows, variable thermal emittance devices etc.

A typical electrochromic device is a thin film multilayer, comprising a cathode and an anode, separated by an ion conductor, and covered by transparent electron conductors on both outer sides. Such a thin film stack may be deposited on one substrate, if the ion conductor is a thin film (an all-thin-film device), or embedded between two substrates if the ion conductor is a polymer (laminated device). Such a device changes its optical transmittance from transparent to colored and back upon charge transfer between the anode and the cathode. It is required that both the anode and the cathode have suitable optical properties, i.e., are sufficiently transparent in the bleached state and sufficiently dark in the colored state. An extensive survey on electrochromic materials and devices can be found in C. G. Granqvist, Handbook of inorganic electrochromic materials, Elsevier, 1995.

In an electrochromic device—such as a window, a mirror, or a light reducing filter—it is desirable that the electrochromic thin film stack is not visually noticeable when it is in its bleached state. However, many known inorganic electrochromic oxide films, such as the oxides of nickel, iridium, and vanadium, have the drawback of not being perfectly colorless in their maximum transparent state; the films appear slightly yellow-green-brownish due to reduced transmittance (increased absorptance) in the wavelength range below 500 nm.

Examples of earlier work on increased transmittance in the bleached state are U.S. Pat. No. 5,798,860, concerning reduction of absorption in iridium oxide by addition of nitrogen, and U.S. Pat. No. 5,724,177, relating to increase of transmittance by applying an anti-reflecting layer on the outer side of the electrochromic device. For devices based on organic electrochromic materials, reduction of residual color in the bleached state is described in U.S. Pat. No. 6,188,505.

SUMMARY OF THE INVENTION

The object of the invention is to provide a new electrochromic film and device, which overcomes the drawbacks of the prior art films and devices. This is achieved by the electrochromic film as defined in claim 1, and the electrochromic device as defined in claim 19.

One advantage with such an electrochromic film is that, compared to prior art films, the transmittance in the bleached state is increased, particularly in the wavelength range below 500 nm.

Another advantage is that material costs are reduced when substituting expensive elements such as iridium (Ir) with cheaper elements such as Mg, Al, Nb, Zr and Ta.

Embodiments of the invention are defined in the dependent claims.

DETAILED DESCRIPTION OF THE INVENTION

Figure 1:
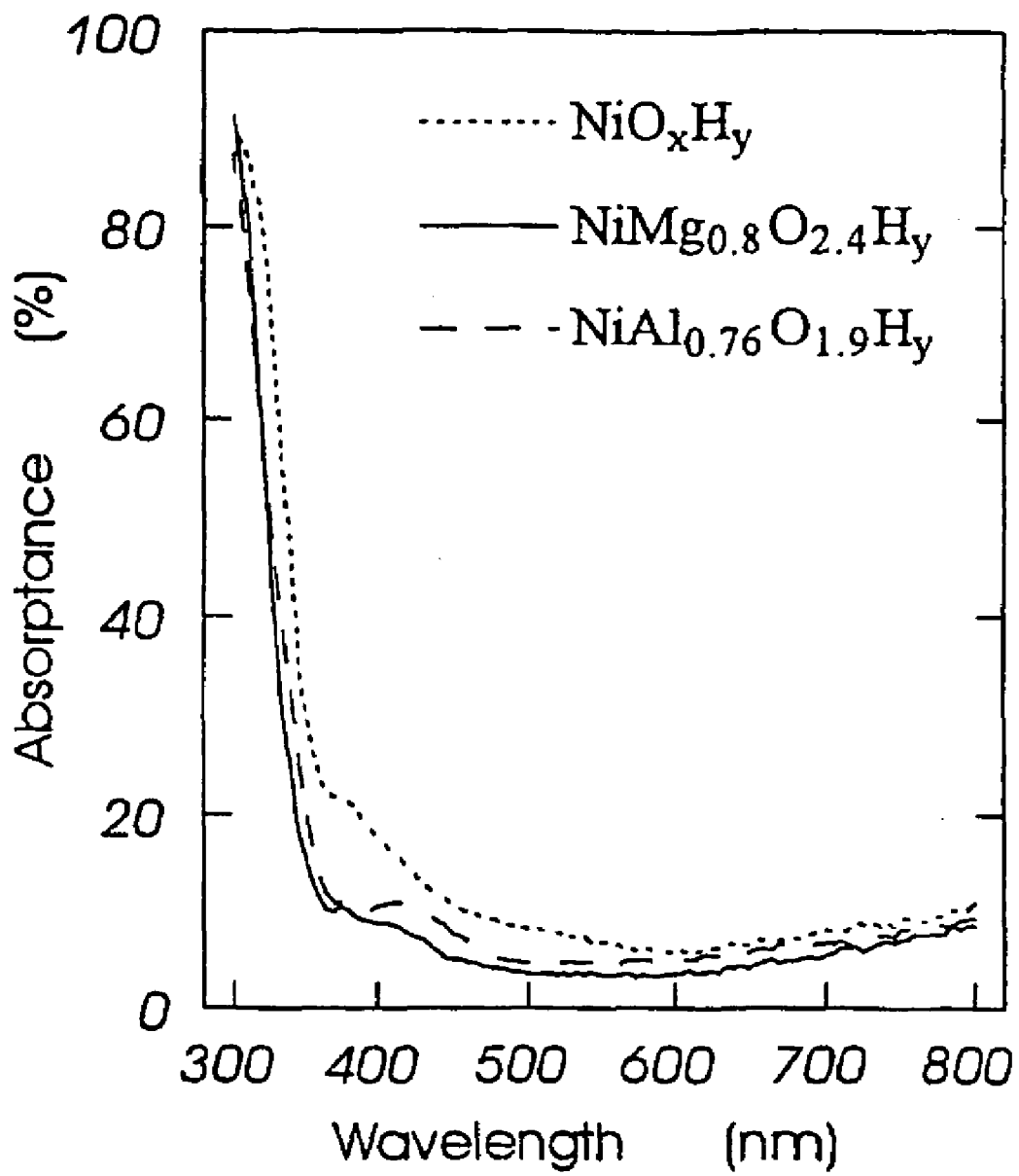
FIG. 1 shows the absorptance in the bleached state for nickel-magnesium and nickel-aluminum oxide films, compared to a pure nickel oxide film.

The present invention generally involves addition of one or more elements from the group comprising the elements: Mg, Ca, Sr, Ba, Al, Nb, Zr, Ta and Si to known electrochromic oxides, hydrated oxides, hydroxides, oxyfluorides, oxynitrides, oxyhydroxides or alkali-metal-containing oxides. A number of experiments with different compositions have shown that electrochomic films of this type have higher film transmittance, particularly in the wavelength range below 500 nm, in the bleached state.

To achieve the desired characteristics it has been shown that the electrochromic film according to the invention can be described with the general formula:

$$A_p B_q O_x D_y$$

wherein:

A is an element or any combination of two or more elements from the group consisting of Ni, Ir, Cr, V, Mn, Fe, W, Mo, Ti, Pr and Hf the total amount being set to p, B is an element or any combination of two or more elements from the group consisting of Mg, Ca, Sr, Ba, Al, Nb, Zr, Ta and Si, the total amount being set to q, O is oxygen, D is an element from the group consisting of: H, F and N.

The desired film transmittance characteristics are achieved when the ratio q/p is greater than 0.2 and less than 3.5, x is greater than 0.5(p+q) and less than 5(p+q), and y is equal to or greater than 0 and less than 2x. When A is Ni, Ir, Cr or Fe, and B is Mg, Al, Nb, Zr or Ta, q/p preferably is greater than 0.5 and less than 3.

The film may further comprise an amount of Li, Na or K, or any combination thereof.

In more general terms this implies that the content of B metal(s) in the film should be at least 20% and at most 350% of the content of A metal(s). Hence, the present invention prescribes a relatively large addition of B metal(s), compared to known compositions as described in JP publ. appl. 61-029822 and in JP publ. appl. 10-197905. In JP 61-029822 a small amount (2%) of a metal M (Mg, Ca and others outside the scope of this application) is added to an Ir-oxide film, whereby a finely porous film with enhanced durability is achieved. JP 10-197905 describes the addition of 10–1000 ppm (weight ratio) MgO and optionally $Al_2O_3$ to a $WO_3$ and $MoO_3$ based electrochromic film, whereby the coloration speed for the film is increased.

The invention will now be illustrated by a number of non-limiting examples wherein the additive is Mg or Al. From these examples it can be concluded that the ratio q/p preferably should be greater than 0.2 and less than 3.5. More preferably, for "A" being Ni, and "B" being Mg or Al, the ratio q/p preferably should be greater than 0.2 and less than 1.1 (optimum being 0.5<q/p<0.9). For "A" being Ir, and "B" being Mg, the ratio q/p preferably should be greater than 2 and less than 3. For "A" being W, and "B" being Mg or Al, the ratio q/p preferably should be greater than 0.8 and less than 1.2.

Examples of a few magnesium- and aluminum-containing oxides are given below, showing that such films are more transparent than the corresponding oxides without magnesium or aluminum. The films have been deposited by DC magnetron sputtering from metallic targets in an atmosphere of argon and oxygen; for the films containing nickel, hydrogen was added to the sputtering atmosphere as well; these measures are well known within the art.

It is believed that the changes in optical properties upon "B" element addition arise from these oxides having a larger bandgap than the respective oxides without the "B" element. It can be speculated that the bandgap increase is more likely to occur if the "B" element forms a single-phase oxide with the other metal, as opposed to a separate phase of "B" oxide being added to another phase of the other oxide. For example, pure MgO was found to be electrochemically inactive, and a separate phase of MgO in the electrochromic films is thought not to serve a useful purpose; yet, it is expected that such a phase may be tolerated if it cannot be avoided by specific deposition techniques or the like. The formulas defining the films specified hereafter therefore refer to the total amount of atoms in the film irrespective of the phase composition of the film.

The essence of the present invention is illustrated in FIG. 1, comparing the absorptance in the maximum transparent state for a film of $NiO_xH_y$, a film of $NiMg_{0.8}O_{2.4}H_y$, and a film of $NiAl_{0.76}O_{1.9}H_y$. Designations x and y indicate that the elemental concentrations have not been determined. The films used in FIG. 1 are 200 nm thick. Absorptance has been calculated as 1-T-R (where T and R denote transmittance and reflectance, respectively) and expressed in percent. As clearly can be seen in the figure, the absorptance is slightly lower for the magnesium- and aluminum-containing films than for the $NiO_xH_y$ film throughout the whole visible range, with the difference between the films increasing as the wavelength decreases. Increased absorptance in the range 380–500 nm renders the pure nickel oxide film yellow-brownish, while the Mg- and Al-containing films have less residual color due to lower absorptance.

In terms of numbers it has been found that the absorptance for a 200 nm thick film of $Ni_pB_qO_xH_y$ in the bleached state, where B is one of Mg, Al, Zr, Ta, Nb, is below 18% at 400 nm wavelength.

Figure 2:
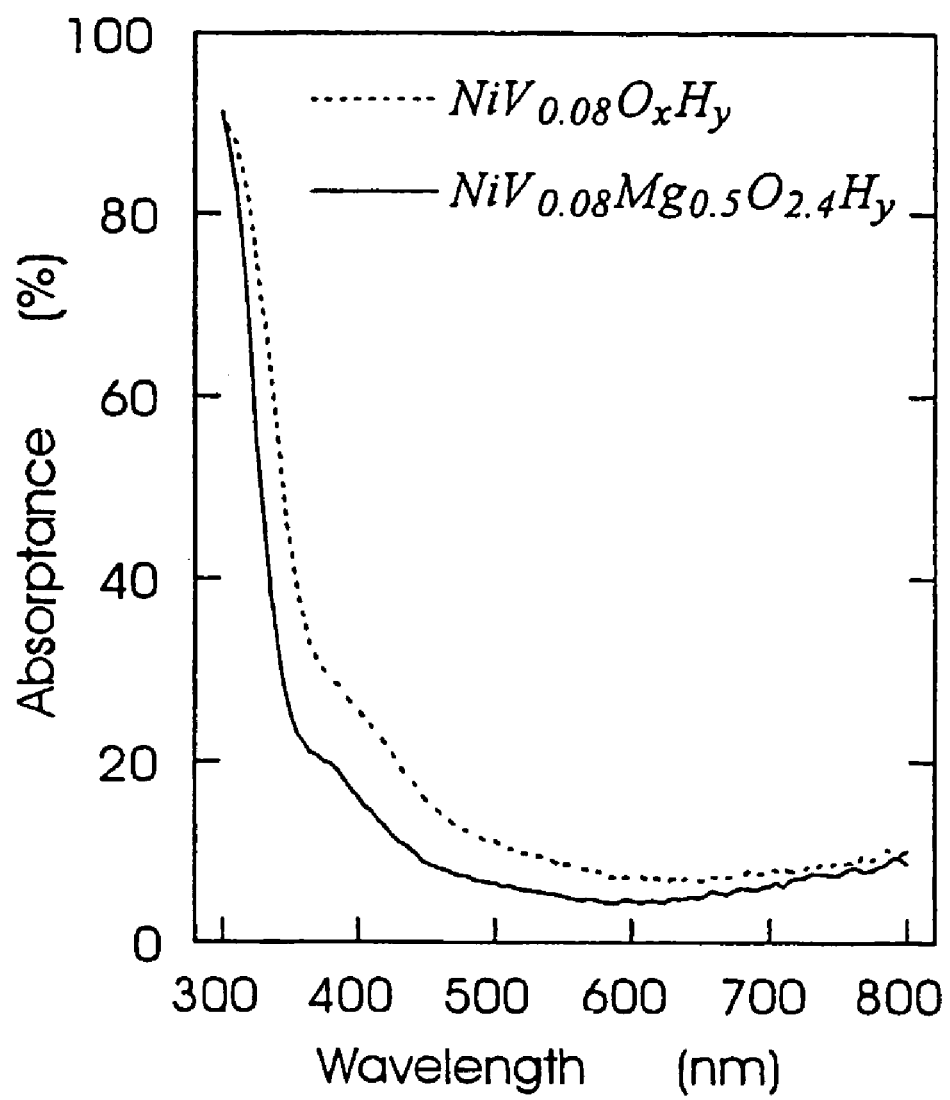
FIG. 2 shows the absorptance in the bleached state for a nickel-magnesium-vanadium oxide film, compared to a pure nickel-vanadium oxide film.

The same effect is observed upon addition of magnesium to nickel-vanadium oxide films. FIG. 2 shows the absorptance in a film of $NiV_{0.08}Mg_{0.5}O_{2.4}H_y$ in comparison to a film of $NiV_{0.08}O_xH_y$, in the bleached state. No effect of Mg or Al addition has been seen on the film appearance in the colored state.

Figure 3:
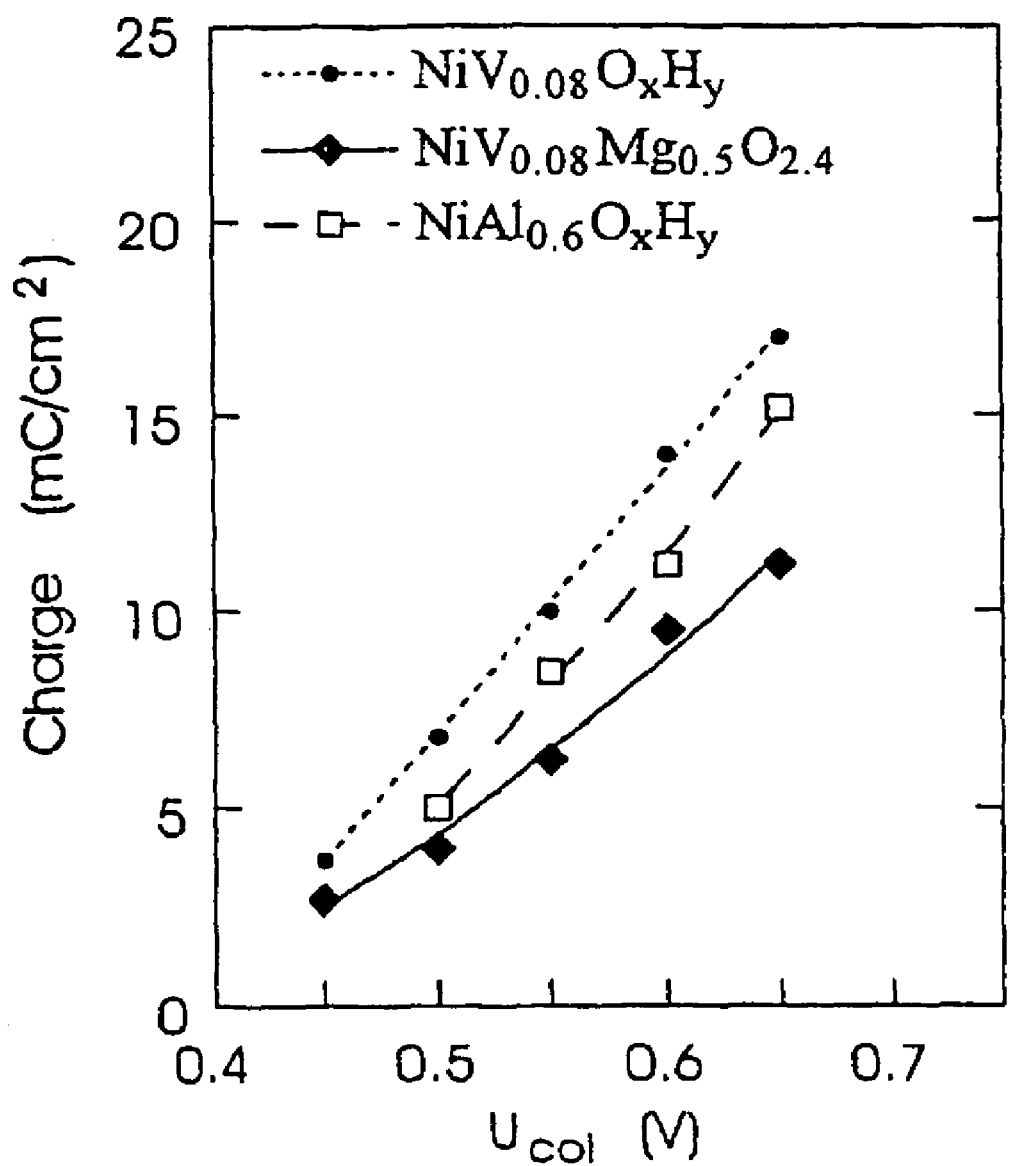
FIG. 3 shows the charge capacity for a nickel-magnesium and a nickel-aluminum oxide films, compared to a pure nickel oxide film.

Apart from reduced absorption in the bleached state, it is crucial that the films do not loose their electrochemical activity upon the addition of element "B". FIG. 3 compares the charge capacity for $NiV_{0.08}O_xH_y$, $NiV_{0.08}Mg_{0.5}O_{2.4}H_y$ and $NiAl_{0.6}O_xH_y$ films as a function of coloration potential upon cycling in 1M KOH. It can be seen that to obtain a similar capacity, the Mg-containing film requires 0.05 to 0.1 V higher coloration potential than the film without magnesium. Such an increase in the coloration potential is marginal and can be tolerated for electrochromic applications. The film of $NiAl_{0.6}O_xH_y$ has substantially the same charge capacity as $NiV_{0.08}O_xH_y$ under the same cycling conditions. Upon cyclic voltammetry, the same shape of voltammograms—typical to nickel oxide—was obtained for the films with and without magnesium/aluminum.

Figure 4:
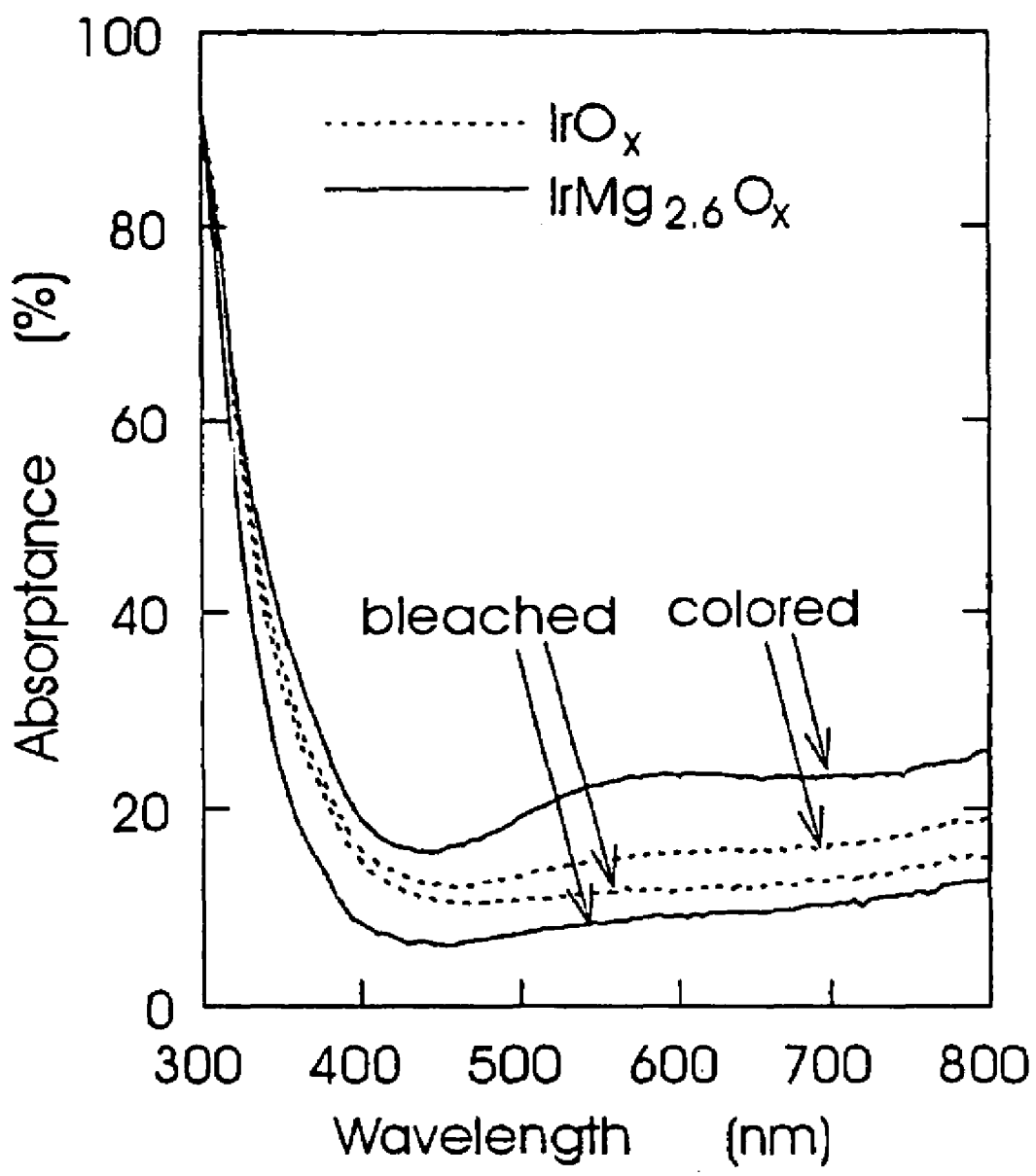
FIG. 4 shows the absorptance in the bleached and colored states for an iridium-magnesium oxide film, compared to a pure iridium oxide film.

FIG. 4 gives an example of the absorptance in the colored and bleached states for a film of iridium oxide and iridium-magnesium oxide with a Mg/Ir atom ratio of approximately 2.6. It can be seen that the absorptance in the bleached state has decreased upon magnesium addition, and, again, the difference between the two compositions becomes larger at shorter wavelengths, especially for wavelengths below 500 nm. Apart from being more transparent in the bleached state, the Mg-containing film furthermore is slightly darker in the colored state, which is beneficial from a device operation point of view.

Figure 5:
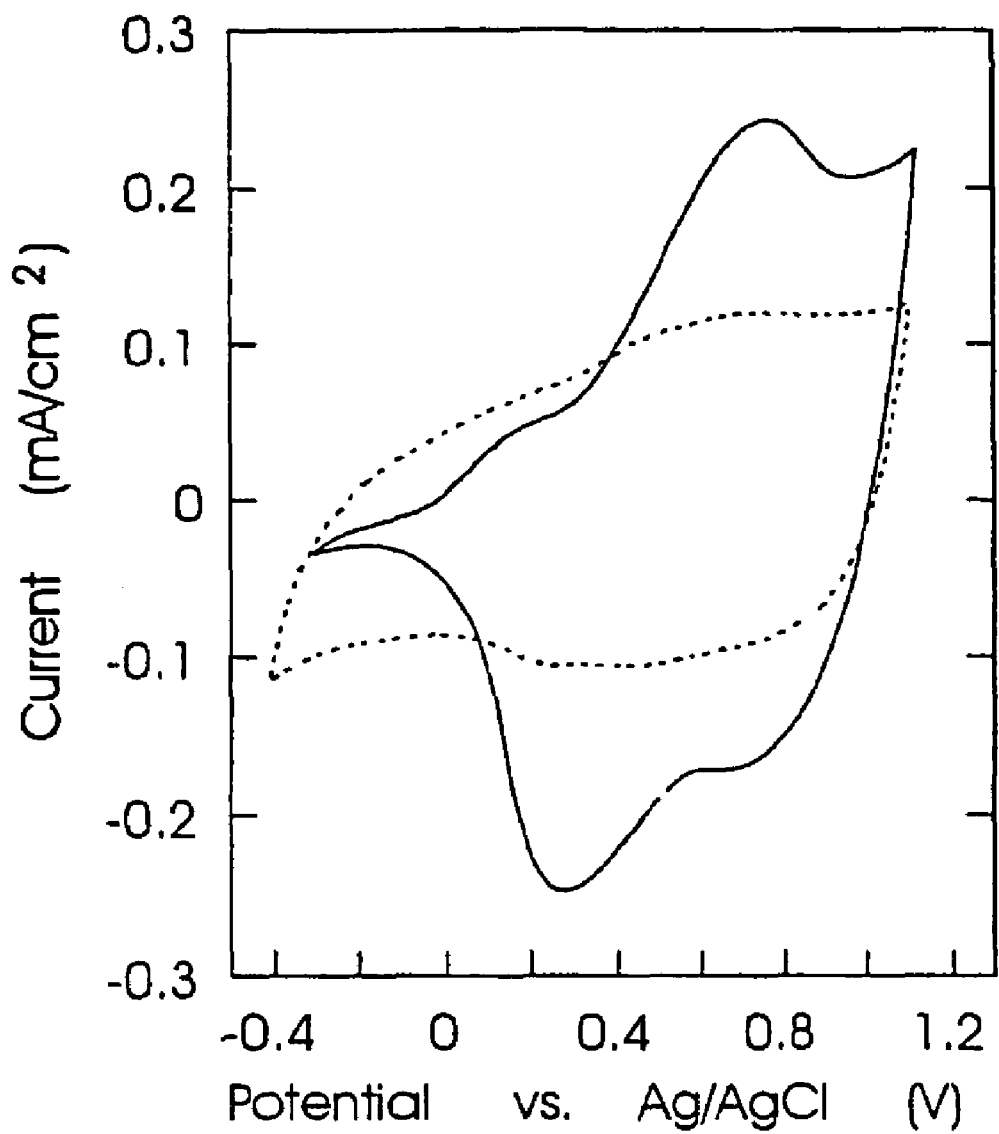
FIG. 5 shows a voltammogram for an iridium-magnesium oxide film in comparison to a pure iridium oxide film.

Unlike for the above examples with nickel, the voltammogram of iridium-magnesium oxide films in 0.1M propionic acid—shown in FIG. 5—is of a clearly different shape than that of pure iridium oxide. The magnesium containing films have somewhat larger charge capacity (proportional to the area of the voltammogram) than pure iridium oxide under the same cycling conditions, which may be the reason for the deeper color in the colored state. The voltammograms in FIG. 5 were recorded on the same films as those reported on in FIG. 4.

For devices with an iridium-magnesium oxide anode and a tungsten oxide cathode, luminous transmittance in the bleached state $T_{lum} \geq 80\%$ has been obtained with chromaticity coordinates x=0.34, y=0.34, z=0.32, where the values of x=y=z=0.33 would correspond to a colorless device. The parameters x, y and z are standard parameters for chromaticity coordinates, and should not be mixed with the subscripts of the inventive chemical formula. The concept of chromaticity coordinates is described in detail in [S. J. Williamson, H. Z. Cummins, Light and Color in Nature and Art, J. Wiley and Sons, New York, 1983, pages 69–72].

The above examples concern anodic electrochromic oxides. To give an example of a cathodic electrochromic material, a high short-wavelength transmittance was observed for tungsten-magnesium oxide as well. In addition, the colored state changed from $WO_3$-blue toward more gray as the Mg content increased, with the films being color neutral (gray) in the colored state at an Mg to W atom ratio of approximately 1. With respect to the colored state, an addition of Mg to tungsten oxide has an effect similar that of addition of V, Ti or Zn, as described in U.S. Pat. No. 5,847,858.

A high UV transmittance is obtained for devices with both the anode and the cathode containing magnesium. Typically, the UV transmittance in any state of coloration is 1.5–2 times higher for a device with an iridium-magnesium oxide anode and a tungsten-magnesium oxide cathode, compared to data for a similar device with electrodes without magnesium, which is useful for applications using UV light.

The above examples concern films deposited onto glass substrates. The same compositions may be deposited onto virtually any kind of substrate, including plastic, unless the substrate is incompatible with the specific application or the process of film deposition. One such restriction may come from elevated temperature, used, for example, for deposition of vanadium oxide films.

The electrochromic film according to the invention can be comprised in enhanced electrochromic devices, such as switchable windows, electrochromic displays, dimable mirrors, variable thermal emittance devices and the like. Specifically, the electrochromic film according to the invention can be comprised in a display for a mobile phone.

From the film deposition point of view, the addition of element "B" does not introduce new requirements on the substrate temperature. The substrate may be externally heated, as is done, for example, when crystalline films of vanadium or tungsten oxide are deposited. The substrate may be externally cooled, as is done, for example, upon coating plastic foils. And, of course, deposition may be done without providing external heating or cooling if there are no requirements for such.

To conclude, the examples, together with other experiments not presented herein, show that the following compositions exhibit excellent short-wavelength transmittance in the bleached state:

| | |
|---|---|
| $NiMg_qO_xH_y$ ($0.2 < q < 1.1$ and $1 < x < 3$, $0 \leq y < 3$) | optimum: $q \approx 0.8$ |
| $NiAl_qO_xH_y$ ($0.2 < q < 1.1$ and $1 < x < 3$, $0 \leq y < 3$) | optimum: $q \approx 0.5$–$0.9$ |
| $(NiV_{0.08}Mg_qO_xH_y$ ($0.2 < q < 1.1$ and $1 < x < 3$, $0 \leq y < 3$) | |
| $NiZr_qO_xH_y$ ($0.2 < q < 1.5$ and $1 < x < 3$, $0 \leq y < 3$) | optimum: $q \approx 0.5$–$1.0$ |
| $NiTa_qO_xH_y$ ($0.2 < q < 1.5$ and $1 < x < 3$, $0 \leq y < 3$) | optimum: $q \approx 0.5$–$1.0$ |
| $NiNb_qO_xH_y$ ($0.2 < q < 1.5$ and $1 < x < 3$, $0 \leq y < 3$) | optimum: $q \approx 0.5$–$1.0$ |
| $IrMg_qO_x$ ($2 < q < 3$ and $1 < x < 4.5$) | optimum: $q \approx 2.6$ |
| $IrAl_qO_x$ ($0.5 < q < 3$ and $1 < x < 4.5$) | |
| $WMg_qO_x$ ($0.8 < q < 1.2$ and $1 < x < 5$) | optimum: $q \approx 1$ |
| $WAl_qO_x$ ($0.8 < q < 1.2$ and $1 < x < 5$) | |

Other combinations that have been evaluated with positive results include compositions wherein A=Ir and B=Ta.

Above a number of embodiments have been described. However, it is obvious that the composition could be varied without deviating from the inventive idea of providing an improved electrochromic film and device comprising such.

Therefore the present invention should not be regarded as restricted to the above-disclosed examples but can be varied within the scope of the appended claims.

The invention claimed is:

1. Electrochromic film with the general formula:
$A_pB_qO_xD_yE_z$, wherein
A is an element selected from:
Ni optionally in combination with one or more elements from the group consisting of Ir, Cr, V, Mn, Fe, W, Mo, Ti, Pr and Hf,
Ir optionally in combination with one or more elements from the group consisting of Cr, V, Mn, Fe, W, Mo, Ti, Pr and Hf, and
W optionally in combination with one or more elements from the group consisting of Cr, V, Mn, Fe, Mo, Ti, Pr and Hf, the total amount being set to p;
B is an element selected from:
if A is Ni: the group consisting of Mg, Ca, Sr, Ba, Al, Nb, Zr and Si, or any combination thereof,
if A is Ir: the group consisting of Mg, Ca, Sr, Ba, Al, Nb and Zr, or any combination thereof, and
if A is W: the group consisting of Mg, Ca, Si, Sr, Al and Zr or any combination thereof, and
the total amount being set to q;
O is oxygen;
D:
if A is Ni or W: D is an element selected from the group consisting of H, F and N or any combination thereof, and
if A is Ir: D is H; and
$E_z$ is an optional amount of Li, Na or K, or any combination thereof,
wherein,
if A is Ni, the ratio q/p is greater than 0.2 and less than 3.5,
if A is Ir, the ratio q/p is greater than 0.2 and less than 3.5, and
if A is W, the ratio q/p is greater than 0.5 and less than 3.5, and
wherein x is greater than 0.5(p+q) and less than 5(p+q) and that y is equal to or greater than 0 and less than 2x.

2. Electrochromic film according to claim 1 wherein A is Ni or Ir, B is Mg, Al, Nb or Zr, and that the ratio q/p is greater than 0.5 and less than 3.

3. Electrochromic film according to claim 1 wherein B is Mg.

4. Electrochromic film according to claim 1 wherein B is Al.

5. Electrochromic film according to claim 1 wherein A is Ni.

6. Electrochromic film according to claim 1 wherein A is Ni and V, where the amount of V is between 4% and 12% with respect to amount of Ni, and preferably approximately 8% with respect to amount of Ni.

7. Electrochromic film according to claim 5 wherein B is Mg, the ratio q/p is greater than 0.2 and less than 1.1, preferably the ratio q/p is approximately 0.8.

8. Electrochromic film according to claim 5 wherein B is Al, the ratio q/p is greater than 0.2 and less than 1.1, preferably greater than 0.5 and less than 0.9.

9. Electrochromic film according to claim 5 wherein B is Zr, and that the ratio q/p is greater than 0.2 and less than 1.5, preferably greater than 0.5 and less than 1.0.

10. Electrochromic film according to claim 5 wherein B is Nb, and that the ratio q/p is greater than 0.2 and less than 1.5, preferably greater than 0.5 and less than 1.0.

11. Electrochromic film according to claim 1 wherein A is Ir.

12. Electrochromic film according to claim 11 wherein B is Mg, and that the ratio q/p is greater than 2 and less than 3, and preferably approximately 2.6.

13. Electrochromic film according to claim 11 wherein B is Al, and that the ratio q/p is greater than 0.5 and less than 3.

14. Electrochromic film according to claim 1 wherein A is W.

15. Electrochromic film according to claim 14 wherein B is Mg or Al, the ratio q/p is greater than 0.8 and less than 1.2.

16. Electrochromic film according to claim 14 wherein B is Mg or Al, the ratio q/p is approximately 1.

17. Electrochromic device comprising at least one electrochromic film according to claim 1.

18. Switchable window comprising an electrochromic device according to claim 16.

19. Display comprising an electrochromic device according to claim 16.

20. Mobile phone comprising an electrochromic device according to claim 16.

21. Dimable mirror comprising an electrochromic device according to claim 16.

22. Variable thermal emittance device comprising an electrochromic device according to claim 16.

23. Electrochromic film with the general formula: ApBqOxDyEz, wherein

A is an element selected from:

Ni optionally in combination with one or more elements from the group consisting of Ir, Cr, V, Mn, Fe, W, Mo, Ti, Pr and Hf, Ir optionally in combination with one or more elements from the group consisting of Cr, V, Mn, Fe, W, Mo, Ti, Pr and Hf, and W optionally in combination with one or more elements from the group consisting of Cr, V, Mn, Fe, Mo, Ti, Pr and Hf, the total amount being set to p;

B is an element selected from:

if A is Ni: the group consisting of Mg, Ca, Sr, Ba, Al, Nb, Zr and Si, or any combination thereof, if A is Ir: the group consisting of Mg, Ca, Sr, Ba, Al, Nb and Zr, or any combination thereof, and if A is W: the group consisting of Mg, Ca, Si, Sr, Al and Zr or any combination thereof, and the total amount being set to q;

O is oxygen;

D:

if A is Ni or W: D is an element selected from the group consisting of H, F and N or any combination thereof, and if A is Ir: D is H; and $E_z$ is at least one of Li, Na or K, or any combination thereof, wherein, if A is Ni, the ratio q/p is greater than 0.2 and less than 3.5, if A is Ir, the ratio q/p is greater than 0.2 and less than 3.5, and if A is W, the ratio q/p is greater than 0.5 and less than 3.5, and wherein x is greater than 0.5(p+q) and less than 5(p+q) and that y is equal to or greater than 0 and less than 2x.

24. Electrochromic film with the general formula: ApBqOxDyEz, wherein

A is an element selected from:

Ni optionally in combination with one or more elements from the group consisting of Ir, Cr, V, Mn, Fe, W, Mo, Ti, Pr and Hf, Ir optionally in combination with one or more elements from the group consisting of Cr, V, Mn, Fe, W, Mo, Ti, Pr and Hf, and W optionally in combination with one or more elements from the group consisting of Cr, V, Mn, Fe, Mo, Ti, Pr and Hf, the total amount being set to p;

B is Mg or Al, the total amount being set to q;

O is oxygen;

D:

if A is Ni or W: D is an element selected from the group consisting of H, F and N or any combination thereof, and if A is Ir: D is H; and $E_z$ is at least one of Li, Na or K, or any combination thereof, wherein, the ratio q/p is greater than 0.8 and less than 1.2, and wherein x is greater than 0.5(p+q) and less than 5(p+q) and that y is equal to or greater than 0 and less than 2x.

* * * * *